United States Patent Office 2,971,928
Patented Feb. 14, 1961

2,971,928
PLATINUM-ALUMINA CATALYSTS

Harry M. Brennan, Hammond, Ind., and Edmund Field, Chicago, Ill., assignors to Standard Oil Company, Chicago, Ill., a corporation of Indiana No Drawing. Filed Nov. 30, 1955, Ser. No. 550,277

5 Claims. (Cl. 252—466)

This invention relates to the conversion of hydrocarbons and to an improved catalyst therefor. More particularly, it relates to an improved alumina-supported platinum catalyst and to the catalytic hydroforming of petroleum naphthas therewith.

The use of platinum-group metal catalysts is now well-established in the art, where they have been employed for many diverse processes, such as the hydrogenation of carbonyl groups and unsaturated carbon-carbon linkages, dehydrogenation of naphthenes, oxidation of sulfur dioxide, and the like. An especially successful development of recent years has been the use of platinum-alumina catalysts for hydroforming petroleum naphthas, whereby gasoline products are obtained having greatly improved antiknock ratings. An object of our invention is to improve the conversion of hydrocarbons with such catalysts, and particularly to improve the hydroforming of petroleum naphthas with platinum-alumina catalysts. Another object is to produce an alumina-supported catalyst of improved activity. A further object is to produce a platinum-alumina catalyst of satisfactory activity having a lower concentration of platinum than the prior-art catalysts. These and other objects of our invention will be apparent from the following description thereof.

We have earlier discovered, in collaboration with Roy W. Vander Haar, a new form of alumina, having improved properties as a support for platinum catalysts, prepared by "alkali-aging" peptized alumina at a pH between about 8.5 and 12, and thereafter drying to a volatiles content less than about 50 percent, wet basis, prior to incorporation of platinum therein. This technique is applicable broadly to alumina hydrosols or other forms of hydrous alumina which have been subjected to some degree of peptization (i.e., conversion to the colloidal alumina form) by treatment with a weak acid.

We have now discovered an improvement in the said "alkali-aging" technique, as applied to alumina hydrosols, which improvement comprises carrying out the alkali aging in two stages. Alumina hydrosols commonly contain only about 2 to 10 percent by weight of $Al_2O_3$, and the alumina is further diluted if aqueous alkali is added thereto, with the result that treating vessels of uneconomic size may be required, particularly where long aging periods are employed. In accordance with our invention, this difficulty is avoided by carrying out a preliminary alkali treatment of an alumina hydrosol at a pH level within the range of about 8.5 to 12 until a slurry of alumina is obtained, then separating all or a part of the liquid phase by filtration, centrifugation, settling and decantation, or the like, and continuing or resuming the alkali aging of the alumina, with appropriate addition of alkali or alkaline solution as may be needed to maintain the desired pH level. The required volume of treating vessels can be reduced in this way to a small fraction of the volume heretofore required. In addition, an alumina of substantially increased density and strength is obtained.

Alumina hydrosols can be prepared by a number of methods, such as by hydrolyzing aluminum acetate or an aluminum alkoxide in an aqueous medium under controlled conditions, digesting hydrous alumina in dilute acid, and the like. Alumina hydrosols are most conveniently prepared, however, by the technique described in Heard Re. 22,196 (October 6, 1942). According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 210° F. Thick, viscous hydrosols can be obtained at temperatures above 160° F., while relatively thin hydrosols are obtained at temperatures below 160° F. The mixture of amalgamated aluminum and acidulated water is preferably agitated in order to improve the contact of the reacting materials and to assist in breaking the layer of froth which is ordinarily formed by the hydrogen liberated in the reaction. A reflux condenser is advantageously employed to condense water and acid vapors from the emerging hydrogen stream and to return the resulting condensate to the reaction vessel. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrosol product is a syrupy liquid of opalescent, nearly transparent appearance, containing from around 2 to 10 percent by weight of $Al_2O_3$.

In one embodiment of our invention, a Heard-type alumina hydrosol is agitated and commingled with an alkaline substance, preferably ammonia or ammonium hydroxide, in a quantity sufficient to raise the pH above about 8.5, but insufficient to convert any considerable proportion of the alumina into an aluminate salt. We ordinarily operate at a pH no higher than the maximum level obtainable by adding ammonia to the system under pressure (i.e., below about pH 12), and we prefer to operate in the range of about pH 10 to 11. The alkalized hydrosol is aged at about 50 to 250° F., preferably at ordinary temperatures around 70 to 100° F., until the alumina has been converted into a filterable slurry of a white, finely divided solid, the reaction being ordinarily complete in as little as one hour at pH 9.5 or above, whereas a day may be required at pH 9, and 2 to 3 days at pH 8.5. The slurry thus obtained is filtered to separate the hydrous alumina, suitably at an elevated temperature between about 150 and 200° F. in order to ensure a rapid filtration rate. The alumina is thereafter reslurried with alkali, and the aging is continued under conditions of pH and temperature within the range set forth hereinabove. The aging is continued for an hour or more, preferably in excess of 24 hours, and optimally between about 2 and 7 days. The slurry is again filtered, and the filter cake is dried at ordinary or elevated temperatures up to about 1200° F., preferably between about 150 and 400° F., to a volatiles content less than about 50 percent, wet basis, preferably between about 15 and 40 percent.

The dried cake is impregnated with a platinum-containing solution according to any of the techniques of the prior art to a platinum level between about 0.05 and 1 percent by weight, based on dry $Al_2O_3$. For this purpose, we find it especially advantageous to employ an aqueous chloroplatinic acid solution in a quantity just sufficient to saturate the alumina powder, and to adjust the concentration of platinum in the solution to produce a completed catalyst of the desired platinum content. Thereafter, an ammonium sulfide solution is added in an S:Pt atomic ratio between about 1 and 10 to effect uniform distribution of the platinum in and on the alumina. The impregnated alumina is again dried, pelleted if desired, and finally calcined in air, hydrogen, or an inert gas such as nitrogen or flue gas at 800 to 1200° F., preferably 1000 to 1200° F., for around 3 to 24 hours before being placed on stream in a catalytic process.

In a modification of the foregoing procedure, the solid alumina obtained from the preliminary aging operation is further aged in the presence of vapors of ammonia or a volatile amine. Ammonia gas may be used, for example, at a partial pressure between about 0.1 and 10 atmospheres, preferably around one atmosphere. The cake is contacted for an hour or more at ordinary or elevated temperatures up to around 600° F., preferably around 2 to 7 days at room temperature. The treated alumina is further processed as set forth elsewhere herein.

Ammonia or ammonium hydroxide is a highly advantageous material for use as the alkalizing agent in our process. Other nitrogen bases can also be employed for this purpose, including water-soluble amines such as methylamine, dimethylamine, trimethylamine, ethylamines, isopropylamine, diisopropylamine, and furfurylamine, quaternary ammonium hydroxides such as tetramethylammonium hydroxide and benzyltrimethylammonium hydroxide, and the like. Inorganic bases and alkalies such as sodium hydroxide, sodium carbonate, potassium carbonate, calcium hydroxide, and the like may also be employed in quantities carefully limited to avoid excessively high pH levels; but after such materials are used, it is generally desirable to wash the alkali-aged alumina thoroughly to remove the alkali cations therefrom before drying and impregnating with platinum. In all cases, the alkalizing agent must have an ionization constant sufficiently high to permit it to raise the peptized alumina mixture to a pH above about 8.5, and must be used in a sufficient quantity to reach the desired pH level, but insufficient to convert any considerable quantity of the alumina into aluminate salts. On this basis, a pH of around 11.5 is the practical maximum which we ordinarily choose to employ, and can be produced, for example, by adding about two volumes of aqueous 29 percent ammonium hydroxide to one volume of Heard-type alumina hydrosol. In commingling the alumina with the alkalizing agent, it is desirable to employ rapid agitation, dilution, controlled rate of addition, multiple-point addition, and other expedients known to the art to avoid or to minimize effects of localized overtreatment.

In order to obtain highly active catalysts from alkali-aged alumina, it is important to dry the alkali-aged alumina prior to impregnation with platinum. According to our experience, it is sufficient to dry the alumina to a volatiles content below about 50 percent by weight, wet basis, prior to platinum impregnation, the alumina being converted thereby into a precursor of eta-alumina. The drying is suitably carried out at ordinary or elevated temperatures up to about 400° F., preferably between about 150 and 400° F., and preferably to a volatiles content between about 15 and 40 percent. A drying time of about 1 to 24 hours is ordinarily sufficient, and under favorable conditions a near approach to the equilibrium volatiles content at most temperatures can be achieved in around 5 hours on the average. The approximate equilibrium or near-equilibrium volatiles content of the alumina cake at a series of drying temperatures is set forth in the following table:

| Drying Temperature, ° F. | Ratio $H_2O:Al_2O_3$, molar | Volatiles Content, wet basis, wt. percent |
| --- | --- | --- |
| 220 | 3 | 34.6 |
| 300 | 2.8 | 33.1 |
| 400 | 1 | 15 |

The resulting dried cake, unlike most aluminas known to the prior art, can be pelleted immediately if desired, without a preliminary calcination at high temperature, requiring only pulverization and the addition of a lubricant of the usual sort, such as 4 percent of Sterotex. The dried alumina, before or after being pelleted, but preferably after being impregnated with platinum, is readily converted wholly or in part into eta-alumina by the simple device of further drying at higher temperatures, suitably between about 500 and 1200° F. for a period of 1 to 24 hours or more, and preferably between about 800 and 1200° F. for a period of around 6 to 12 hours, or to a volatiles content approximating the equilibrium level at the temperature employed, as illustrated in the following table:

| Drying Temperature, ° F. | Ratio $H_2O:Al_2O_3$, molar | Volatiles Content, wet basis, wt. percent |
| --- | --- | --- |
| 600 | 0.45 | 7.4 |
| 650 | 0.4 | 6.6 |
| 900 | 0.06 | 1 |

Where the dried alumina has been subjected to pelleting before being converted to eta-alumina, the said conversion is preferably carried out at 1000 to 1200° F. in order to produce completed pellets of highest mechanical strength. The completed alumina, we have found, contains a substantial proportion of eta-alumina, ordinarily 5 percent or more, as indicated by the X-ray diffraction pattern thereof, and may contain approaching 100 percent eta-alumina, depending upon the duration, pH, and temperature of the aging period, and the duration and temperature of the heating periods.

It will be apparent that a preliminary drying to form eta-alumina precursor and a further heat-treatment to form eta-alumina may be carried out in an uninterrupted operation if desired at progressively rising temperature, although we prefer to effect platinum impregnation between the two stages. Alternatively, the entire drying and heat-treating operation may be carried out in a treating zone nominally maintained at a temperature within the range required for the production of eta-alumina (i.e., from about 500 to 1200° F.). In this modification, the preliminary drying is carried out rapidly at rising temperature during evolution of the volatiles, and the period of conversion to eta-alumina follows immediately without interruption.

Our new catalyst can be prepared in any of the usual mechanical forms. It can be ground to a powder for use in fluidized form. It can be broken into irregular fragments. It can be prepared in various shapes, such as pills, pellets, rings, rosettes, saddles, and the like as desired. In the preparation of shaped catalysts, as pointed out hereinabove, our alumina base does not require a preliminary calcination; instead, the dried cake can be pulverized, mixed with a lubricant, and formed directly into shapes; and only thereafter is calcination employed to effect formation of eta-alumina and to set and strengthen the mechanical structure of the shaped material. In most cases, the final conditioning of the catalyst composition, whether pelleted or not, is carried out by calcination in air, hydrogen, or an inert gas at about 1000 to 1200° F. for around 3 to 24 hours before being placed on stream.

"Eta-alumina," as the term is employed herein, refers to a form of alumina of the type defined by Allen S. Russell in his brochure entitled "Alumina Properties," Technical Paper No. 10, copyright 1953, Aluminum Company of America, page 17. In one prior-art method for the preparation of eta-alumina, beta-alumina trihydrate is dried at 284 to 464° F. to an alpha-alumina monohydrate, and the alpha-alumina monohydrate is further heated at 482 to 842° F. The resulting composition is largely eta-alumina, which closely resembles gamma-alumina and is distinguishable therefrom in physical properties only by slight differences in their X-ray diffraction patterns (Stumpf, Russell, Newsome, and Tucker, Ind. Eng. Chem. 42 (1950), 1398–1403). Moreover, it is commonly found that such compositions contain a substantial proportion of gamma-alumina, which, however, is without adverse catalytic effects. Our alumina, after calcination under the conditions described above, contains 5 percent or more of eta-alumina, but differs from the prior-art eta-alumina compositions in some unascertained way, as a result of which it affords platinum-alumina catalysts of strikingly superior activity.

The following specific examples will more clearly illustrate the technique and advantages of our invention.

*Example 1*

Approximately 5 liters of a Heard-type alumina hydrosol containing 5.13 weight-percent of $Al_2O_3$ was commingled with a sufficient quantity of concentrated aqueous ammonium hydroxide solution to reach a pH of 11, and the resulting slurry was heated to boiling and filtered. Half of the filter cake was reslurried with concentrated aqueous ammonium hydroxide solution to a pH of 11, and was allowed to stand at room temperature for one week. The treated slurry was filtered, and the filter cake was dried overnight at 400° F.

The dried cake was employed as a support in the preparation of a 0.4 weight-percent platinum-alumina catalyst according to the following procedure. A 160-gram portion of the cake (containing 128 grams of $Al_2O_3$) was mixed with 200 milliliters of an aqueous solution containing 1.4 grams of a chloroplatinic acid hydrate having a 40 percent platinum content. The wet mixture was allowed to stand for approximately one day at room temperature, and was then dried overnight at 200° F. The dried cake was crushed, lubricated, formed into ⅛″ × ⅛″ cylindrical pellets, and calcined 6 hours at 1000° F.

The completed catalyst was subjected to a hydroforming test under standardized conditions, employing 50 milliliters of catalyst in a quasi-isothermal reaction zone surrounded by an electrically heated block for temperature control. The tests were carried out at a catalyst outlet temperature of 920° F., a pressure of 200 pounds per square inch gage, an hourly weight space velocity of 2, and a once-through hydrogen rate of 5,000 standard cubic feet per barrel of feed. The feed was a hydrofined Mid-Continent virgin naphtha having an ASTM distillation range of 198 to 364° F., a CFR–R octane number of 44.5, an API gravity of 55.6°, an index of refraction $(n_D^{20})$ of 1.4212, a bromine number of 1.24, an $H_2S$ number of zero, a mercaptan number of 0.64, and a composition consisting of 44 percent by volume of paraffins, a trace of olefins, 48 percent naphthenes, 8 percent aromatics, 6 parts per million of sulfur (turbidimetric), 34 parts per million of water, 0.6 part per million of chloride, 1.39 parts per million of peroxide, and between about 2 and 3 parts per million of nitrogen. The catalyst activity was calculated as the relative quantity, expressed as a percentage, of an arbitrarily chosen standard catalyst, containing 0.6 percent platinum on alumina, required to produce a $C_5+$ product fraction having the same octane number from the original Mid-Continent virgin naphtha under the same test conditions. The results were as follows:

| Product Interval, hr. | Product Octane[1] CFR–R | Relative Activity |
| --- | --- | --- |
| 0–20 | 96.8 | 103 |
| 20–40 | 95.1 | 78 |
| 40–60 | 94.3 | 68 |
| 60–80 | 93.0 | 59 |
| 80–100 | 92.6 | 57 |

[1] Adjusted to an average catalyst temperature of 903° F.

*Example 2*

The other half of the filter cake prepared in Example 1 was placed in a bottle containing ammonia gas, and the bottle was stoppered and allowed to stand at room temperature for one week. At the end of this time, a small aqueous phase was removed from the cake by decantation, and the cake was dried overnight at 400° F. The dried cake was employed as a support in the preparation of a 0.4 weight-percent platinum-alumina catalyst according to the procedure described in Example 1. A catalyst of high activity was obtained thereby.

Our improved catalysts are broadly useful in hydrocarbon-conversion reactions which are catalyzed by platinum. Specifically, our catalysts are useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art, as set forth above. Our catalysts are especially advantageous in the hydroforming of petroleum naphthas boiling in the range of about 200–400° F., and are capable of upgrading a 50 percent naphthenic naphtha having a CFR–R octane number of only 40 to 50 into a $C_5+$ gasoline having an octane number of 90 to 100 in a yield of 80 to 85 percent.

While we have described our invention with reference to certain specific embodiments thereof, it is to be understood that such embodiments are illustrative only and not by way of limitation. Numerous modifications and equivalents of our invention will be apparent from the foregoing description to those skilled in the art.

In accordance with the foregoing description, we claim as our invention:

1. A method for preparing an alumina-supported platinum catalyst which comprises adding an alkaline substance to an alumina hydrosol, said alkaline substance having an ionization constant, and being used in a quantity, sufficient to raise the pH of the resulting mixture of said alkaline substance and said alumina hydrosol to a level within the range of about 8.5 to 12, wherein said pH is insufficient to convert any considerable proportion of the alumina into aluminate salts, maintaining said mixture at a pH within said range and a temperature between about 50 and 250° F. until the alumina contained therein is converted into a filterable slurry comprising a liquid phase and solid, hydrous alumina, separating the liquid phase at least in part from said solid hydrous alumina, further treating said solid, hydrous alumina with a second alkaline substance, said second alkaline substance having an ionization constant, and being used in a quantity, sufficient to raise the pH of the mixture of said solid hydrous alumina and said second alkaline substance to between about 8.5 and 12, continuing to treat said solid hydrous alumina at a pH within said range and at a temperature below about 600° F. for a period in excess of about one hour, drying the treated alumina to a volatiles content between about 15 and 50 percent by weight, wet basis, impregnating the dried alumina with an aqueous platinum solution to a platinum level between about 0.05 and 1 percent by weight, based on dry $Al_2O_3$, and drying and calcining, whereby there is obtained a catalyst comprising at least about 5 weight percent eta alumina.

2. The method of claim 1 wherein said second alkaline substance is ammonia.

3. The method of claim 1 wherein said second alkaline substance is a water-soluble amine.

4. The method of claim 1 wherein said alkaline substances are an inorganic base.

5. A method for preparing a platinum-alumina catalyst which comprises commingling an alumina hydrosol with a quantity of ammonia sufficient to raise the pH of the resulting mixture to a level within the range of about 8.5 to 12, wherein said pH is insufficient to convert any considerable proportion of the alumina into aluminate salts, maintaining the resulting mixture at a pH within said range and a temperature between about 50 and 250° F. until the alumina contained therein is converted into a slurry comprising a liquid phase and solid, hydrous alumina, separating said solid, hydrous alumina from said slurry, contacting the separated solid hydrous alumina with vapors of ammonia at a partial pressure of said ammonia between about 0.1 and 10 atmospheres and at a temperature between about room temperature and about 600° F. for a period in excess of about one day, drying the alumina after contact with ammonia to a volatiles content between about 15 and 50 percent by weight, wet basis, impregnating the dried alumina with an aqueous platinum solution to a platinum level between about 0.05 and 1 percent by weight, based on dry $Al_2O_3$, and drying and calcining, whereby there is obtained an alumina-supported platinum catalyst comprising at least about 5 weight percent eta alumina.

References Cited in the file of this patent

UNITED STATES PATENTS

| | | |
|---|---|---|
| 2,658,028 | Haensel | Nov. 3, 1953 |
| 2,787,522 | Lefrancois | Apr. 2, 1957 |
| 2,818,393 | Lefrancois et al. | Dec. 31, 1957 |